(No Model.)
F. FREEMAN.
SET COLLAR OR COUPLING.
No. 506,039. Patented Oct. 3, 1893.
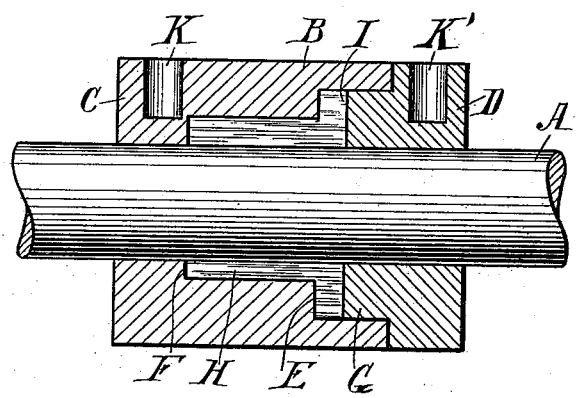
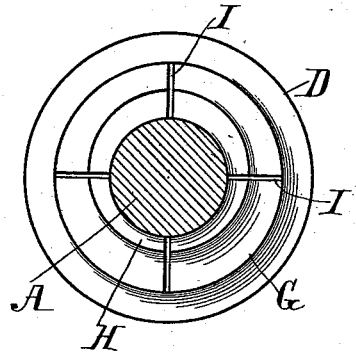
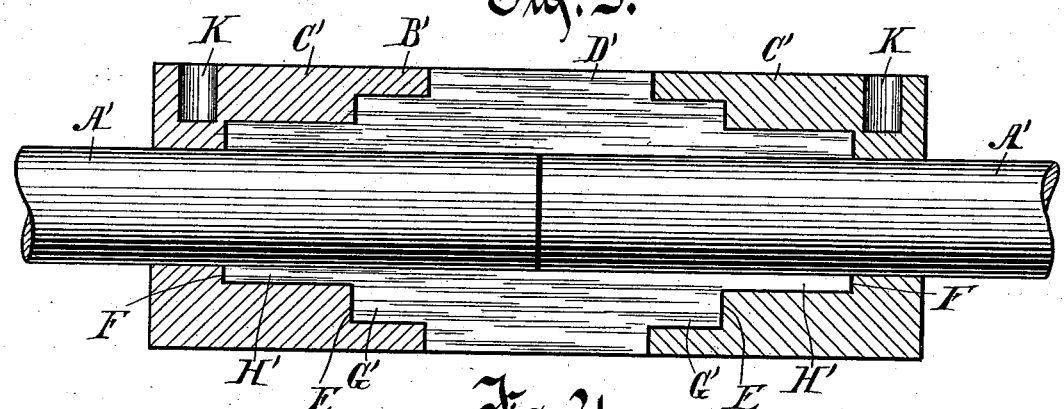
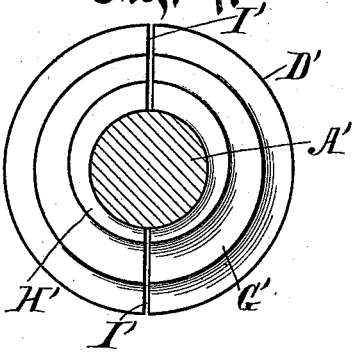
Witnesses.
Inventor.
Frank Freeman
By Benedict Morell
Attorneys.

UNITED STATES PATENT OFFICE.

FRANK FREEMAN, OF HORICON, WISCONSIN.

SET COLLAR OR COUPLING.

SPECIFICATION forming part of Letters Patent No. 506,039, dated October 3, 1893.

Application filed January 26, 1893. Serial No. 459,811. (No model.)

*To all whom it may concern:*

Be it known that I, FRANK FREEMAN, of Horicon, in the county of Dodge and State of Wisconsin, have invented a new and useful Improvement in Set Collars or Couplings, of which the following is a description, reference being had to the accompanying drawings, which are a part of this specification.

My invention consists in the novel form and construction of the improved device adapted to serve as a set collar or coupling for shafts, and in the several parts thereof.

The object of the invention is to provide a device for the general purpose indicated, that combines compactness, simplicity, strength, capability of easy manipulation, and cylindrical smoothness of surface, with entire absence of dangerous, radial projections, such as the heads of collar-securing set screws or the like, which on rapidly revolving shafts are liable to catch the clothing or person of those near the shafts.

In the drawings, Figure 1, is a central, longitudinal section of the single collar, in connection with a fragment of a shaft to which it is secured. Fig. 2, is a view of the inner end of the right hand member of the collar shown in Fig. 1. Fig. 3, is a central, longitudinal section of the double collar or coupling form of my device in connection with fragments of the abutting ends of two parts of a shaft. Fig. 4, is a view of the end of the medial or inner member of the double collar shown in Fig. 3, which member in a general way corresponds with the member shown in Fig. 2.

Referring to the device as shown in Figs. 1 and 2, A is the fragment of a shaft. B is my improved collar having a smooth cylindrical periphery and smooth flat ends. The collar consists of two members C and D. The collar B, formed of the members C and D combined, is provided with a central longitudinal aperture adapted to receive the shaft A fitting closely but movably therein. The member C is also provided with an annular chamber about the shaft, which chamber is of considerable diameter from that end of the member C that abuts against the member D, extending inwardly a short distance and there terminating in an abrupt shoulder E and thence the chamber extends farther inwardly longitudinally of the collar for a distance, terminating abruptly in a shoulder F. The peripheral wall of that part of the chamber which is of greater diameter is concentric with the shaft, but the peripheral wall of that part of the chamber which is of lesser diameter is slightly eccentric to the shaft. The member D is provided with an annular hub G, cylindrical on its periphery and concentric with the shaft, of such diameter as to fit snugly but movably in the outer chamber of greater diameter in the member C, the hub reaching to the shoulder E, when the members are brought together as shown in Fig. 1. An annular flange H, of less diameter than the hub G, projects therefrom and is of a size that adapts it to enter the chamber in the member C, within and beyond the shoulder E. The peripheral surface of the flange H is eccentric to the axis of the shaft and is formed to enter loosely the correspondingly eccentric chamber of the member C. The flange H is split longitudinally by clefts I, I, which extend preferably a little into the hub G, thereby providing for a slight radial inward movement of the parts of the flange H, so that under compression the flange is made to grip the shaft firmly.

From the foregoing description it will be understood that when the two members C and D are brought together on an interposed shaft in the positions shown in Figs. 1 and 2, thereupon by a slight partial rotation of the member C, on the member D, the member C by the eccentricity of the peripheral wall of the inner portion of its chamber is made to compress parts of the interposed flange H, and grip them firmly to the shaft A, thus locking the collar to the shaft.

For connecting a spanner or similar tool to the members C and D for holding and rotating them, they are provided with sockets K and K' respectively.

In the modified form of device shown in Figs. 3 and 4, the shaft A' is in two parts, the extremities of which abut substantially centrally of the central member D' of the double collar B'. There are two members C' C' each having an annular chamber, one of greater diameter concentric with the shaft and a continuation or other part of the chamber of lesser diameter and eccentric to the shaft. The part D' is also double, having at each end a hub G', concentric with the shaft and a flange H of lesser diameter extending from the hub, and eccentric to the shaft and to the axis of the collar. In this double form of device, the part D' may be split at each end by clefts corresponding to the clefts I in the other form of device, or the member may be split completely longitudinally by a cleft I' providing a slight space in the plane of the greatest and least radii of the eccentric. In this modified form of device, the flanges H' H' of the member D' are made to grip the two parts of the shaft A' by slightly partially rotating the members C' on the member D' when the parts of the shaft and the members of the collar are united in the manner shown in Fig. 3, thus effectually coupling the shaft together.

What I claim as my invention, and desire to secure by Letters Patent, is—

1. A cylindrical collar comprising a plurality of members, one member having a cleft tubular flange the periphery of which is eccentric to the axis of the collar, and the complementary member having a chamber the peripheral wall of which is eccentric to the axis of the collar, which chamber is adapted to receive the eccentric tubular flange of the other member, and the wall of which chamber is adapted by slight rotation of the member on the other member, to contact with the eccentric flange and grip it to an encompassed shaft, substantially as described.

2. A cylindrical collar comprising two members, each having a central bore concentric with its axis, one member having an annular cleft flange eccentric on its periphery, and the other member a complementary annular chamber, the peripheral wall of which is correspondingly eccentric to its axis, the flange being adapted to enter the chamber and the chambered member being adapted by a slight rotation thereof on the flanged part to grip the parts of the flange to the encompassed shaft, substantially as described.

3. A cylindrical collar comprising two members, each having a central bore concentric with its axis, one member having an annular hub of considerable diameter concentric with its axis and an annular cleft flange eccentric to its axis, the other member having an annular concentric chamber of considerable diameter, complementary to and adapted to receive the hub of the other member, and a continuation of the annular chamber but of lesser diameter and eccentric to its axis complementary to and adapted to receive the eccentric flange of the other member and by slight rotation thereof to grip it to the encompassed shaft, substantially as described.

In testimony whereof I affix my signature in presence of two witnesses.

FRANK FREEMAN.

Witnesses:
WILBERT IRWIN, Jr.,
WM. SEIFERT.